(12) United States Patent
Kondo

(10) Patent No.: US 11,167,668 B2
(45) Date of Patent: Nov. 9, 2021

(54) SEAT LOCK DEVICE

(71) Applicant: MITSUI KINZOKU ACT CORPORATION, Yokohama (JP)

(72) Inventor: Makoto Kondo, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 0 days.

(21) Appl. No.: 16/630,187

(22) PCT Filed: Jul. 13, 2017

(86) PCT No.: PCT/JP2017/025578
§ 371 (c)(1),
(2) Date: Jan. 10, 2020

(87) PCT Pub. No.: WO2019/012656
PCT Pub. Date: Jan. 17, 2019

(65) Prior Publication Data
US 2020/0130541 A1 Apr. 30, 2020

(51) Int. Cl.
*B60N 2/22* (2006.01)
*B60N 2/90* (2018.01)
(Continued)

(52) U.S. Cl.
CPC .......... *B60N 2/2245* (2013.01); *B60N 2/206* (2013.01); *B60N 2/3009* (2013.01); *B60N 2/90* (2018.02); *B60N 2002/981* (2018.02)

(58) Field of Classification Search
CPC ........ B60N 2/2245; B60N 2/90; B60N 2/206; B60N 2/3009; B60N 2002/981
(Continued)

(56) References Cited

U.S. PATENT DOCUMENTS 6,733,078 B1 5/2004 Zelmanov
9,994,129 B1 * 6/2018 Shirokane ............ B60N 2/2245
(Continued)

FOREIGN PATENT DOCUMENTS

CN 204915358 U 12/2015
DE 10142486 A1 3/2003
(Continued)

OTHER PUBLICATIONS

International Searching Authority, "International Search Report," issued in connection with International Patent Application No. PCT/JP2017/025578, dated Aug. 15, 2017.
(Continued)

*Primary Examiner* — Mark R Wendell
(74) *Attorney, Agent, or Firm* — Foley & Lardner LLP

(57) ABSTRACT

A seat lock device provided to a tiltable seat back comprises: a locking part capable of switching among a locked state wherein a striker installed in a vehicle body is locked, an unlocked state wherein the striker can be disengaged, and a free state wherein the striker is disengaged; an unlocking part disposed at a position different from the locking part on the seat back and having a lever member and a coupling member for coupling the lever member and locking part, and which switches the locking part from the locked state to the unlocked state in response to manipulation of the lever member; and an integrally-molded case which holds the locking part and unlocking part and is fastened to the seat back.

3 Claims, 7 Drawing Sheets

(51) Int. Cl.
*B60N 2/20* (2006.01)
*B60N 2/30* (2006.01)

(58) Field of Classification Search
USPC .................................................. 297/378.12
See application file for complete search history.

(56) References Cited

U.S. PATENT DOCUMENTS

| | | | |
|---|---|---|---|
| 2004/0046434 A1* | 3/2004 | Zelmanov | B60N 2/2245 297/378.13 |
| 2005/0017564 A1* | 1/2005 | Kayumi | B60N 2/01583 297/378.1 |
| 2005/0242647 A1* | 11/2005 | Kim | B60N 2/2245 297/354.12 |
| 2010/0259061 A1* | 10/2010 | Paing | B60N 2/01583 296/65.03 |
| 2012/0193963 A1* | 8/2012 | Lutzka | B60N 2/366 297/378.13 |
| 2012/0227660 A1* | 9/2012 | Windecker | B60N 2/366 116/200 |
| 2015/0028618 A1* | 1/2015 | Seto | B60N 2/366 296/65.09 |
| 2015/0033809 A1 | 2/2015 | Mueller et al. | |
| 2015/0300060 A1 | 10/2015 | Iwasa et al. | |
| 2016/0009202 A1 | 1/2016 | Pejathaya | |
| 2016/0046209 A1* | 2/2016 | Lee | B60N 2/933 297/61 |
| 2018/0257520 A1* | 9/2018 | Shirai | B60N 2/366 |
| 2020/0086772 A1* | 3/2020 | Madhu | B60N 2/366 |
| 2020/0247283 A1* | 8/2020 | Takezaki | B60N 2/366 |

FOREIGN PATENT DOCUMENTS

| | | |
|---|---|---|
| DE | 10 2010 048 398 A1 | 4/2012 |
| DE | 10 2014 112 031 A1 | 2/2016 |
| JP | 2010-000816 A | 1/2010 |
| JP | 2013-506597 A | 2/2013 |
| JP | 5574219 B2 | 7/2014 |
| JP | 2015-205585 A | 11/2015 |
| JP | 2016-215995 A | 12/2016 |
| WO | WO-2006/013023 A2 | 2/2006 |
| WO | WO-2014/141016 A1 | 9/2014 |

OTHER PUBLICATIONS

International Searching Authority, "Written Opinion," issued in connection with International Patent Application No. PCT/JP2017/025578, dated Aug. 15, 2017.

* cited by examiner

[FIG. 1]
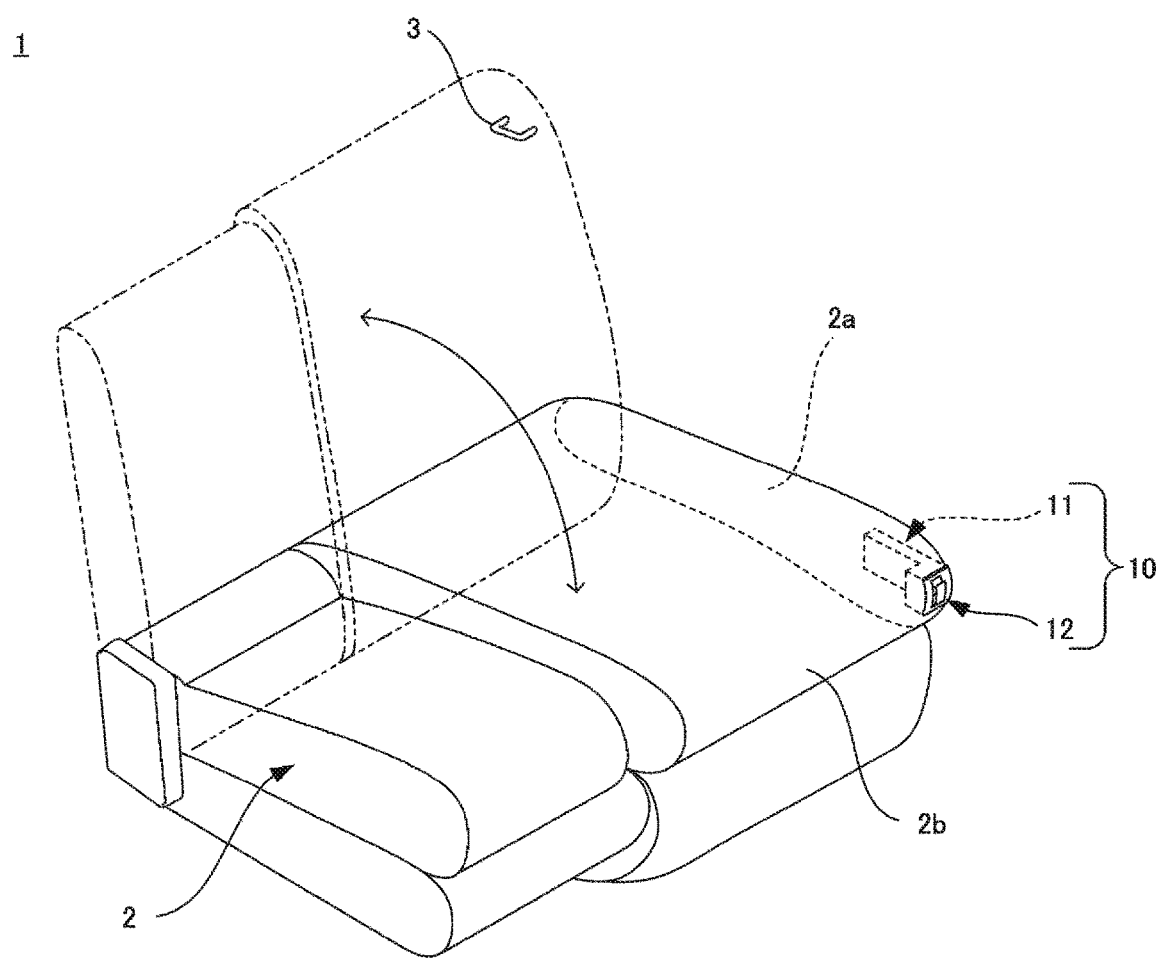

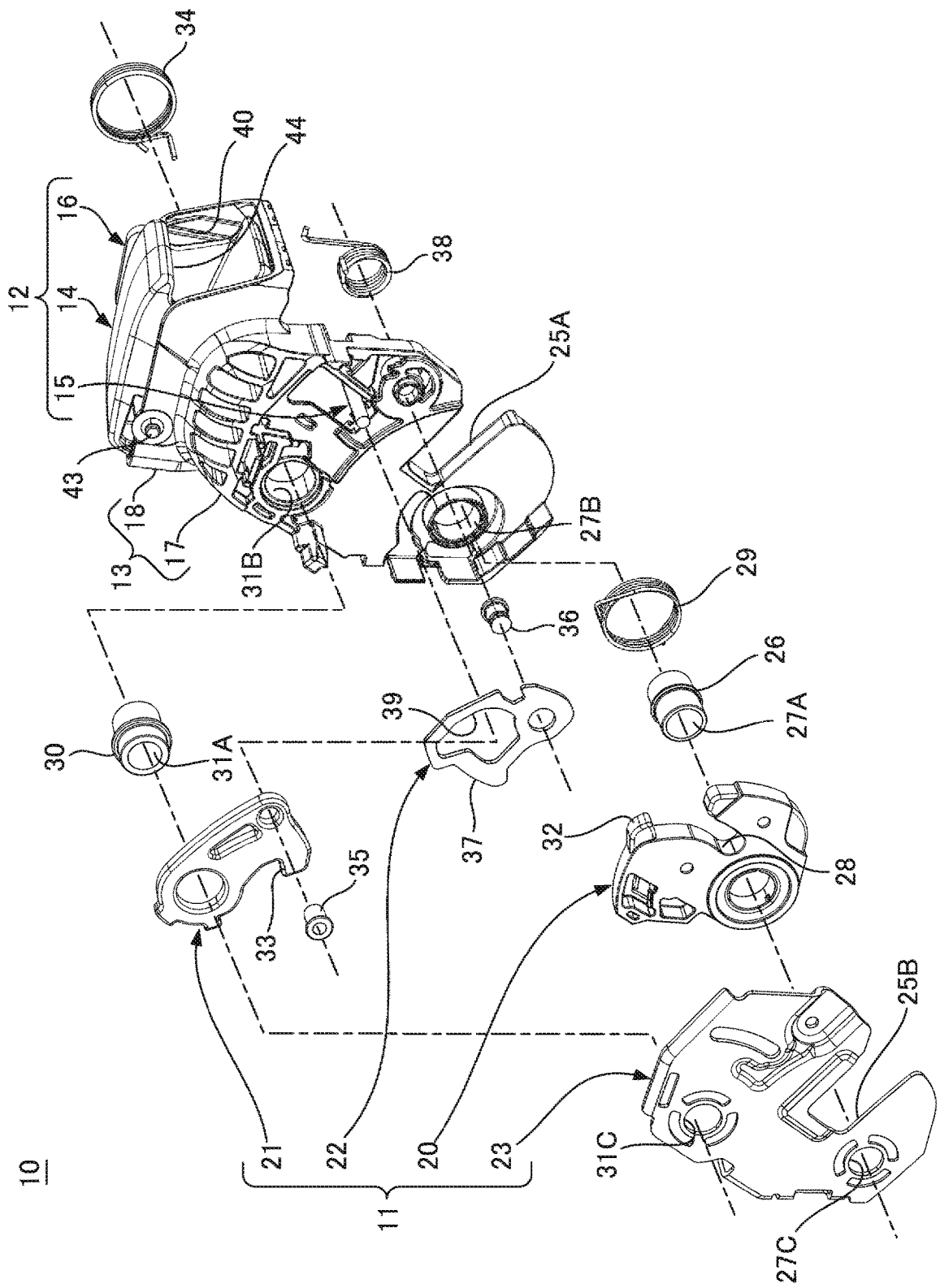
[FIG. 2]

[FIG. 3]
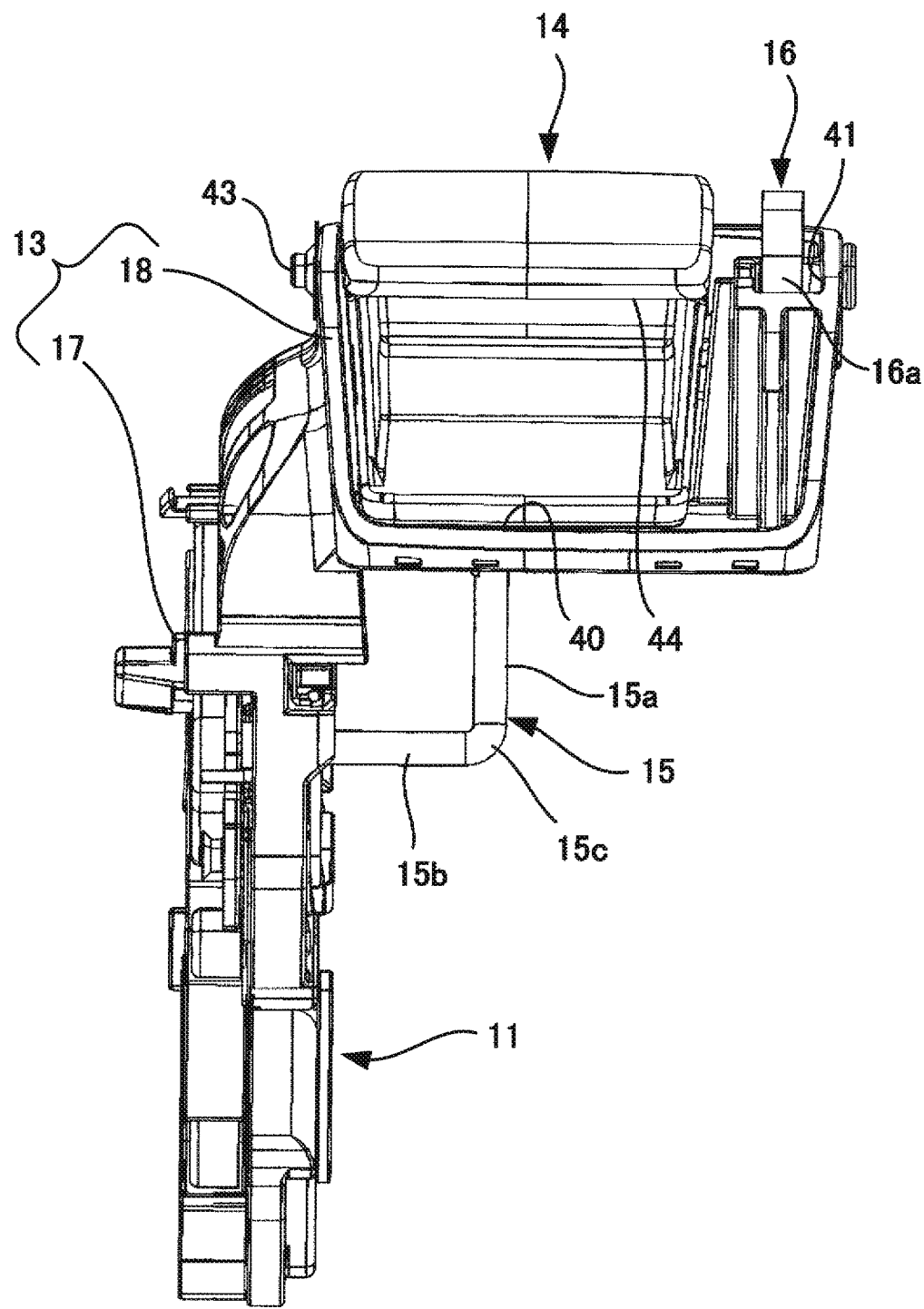

[FIG. 4]
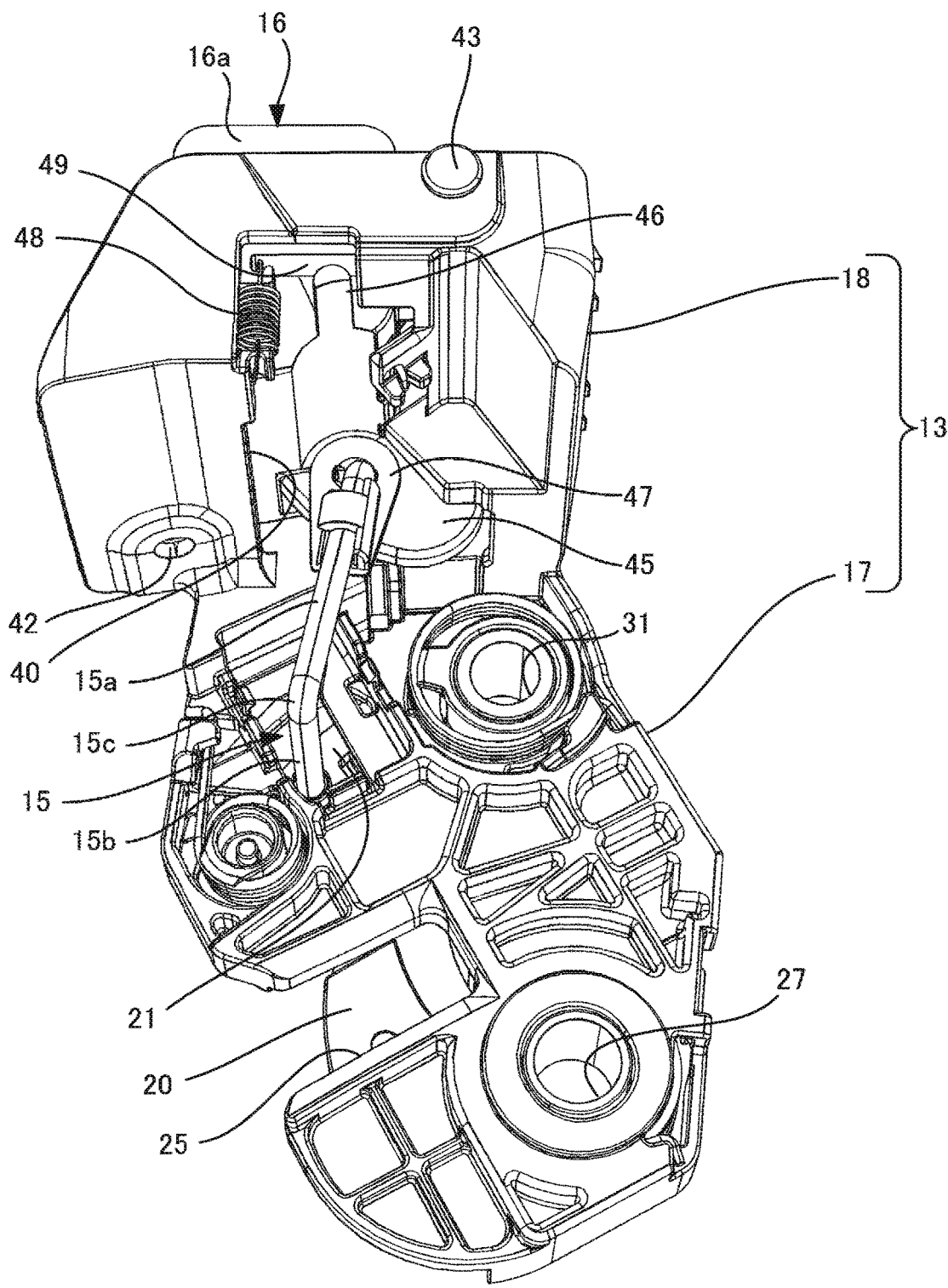

[FIG. 6]
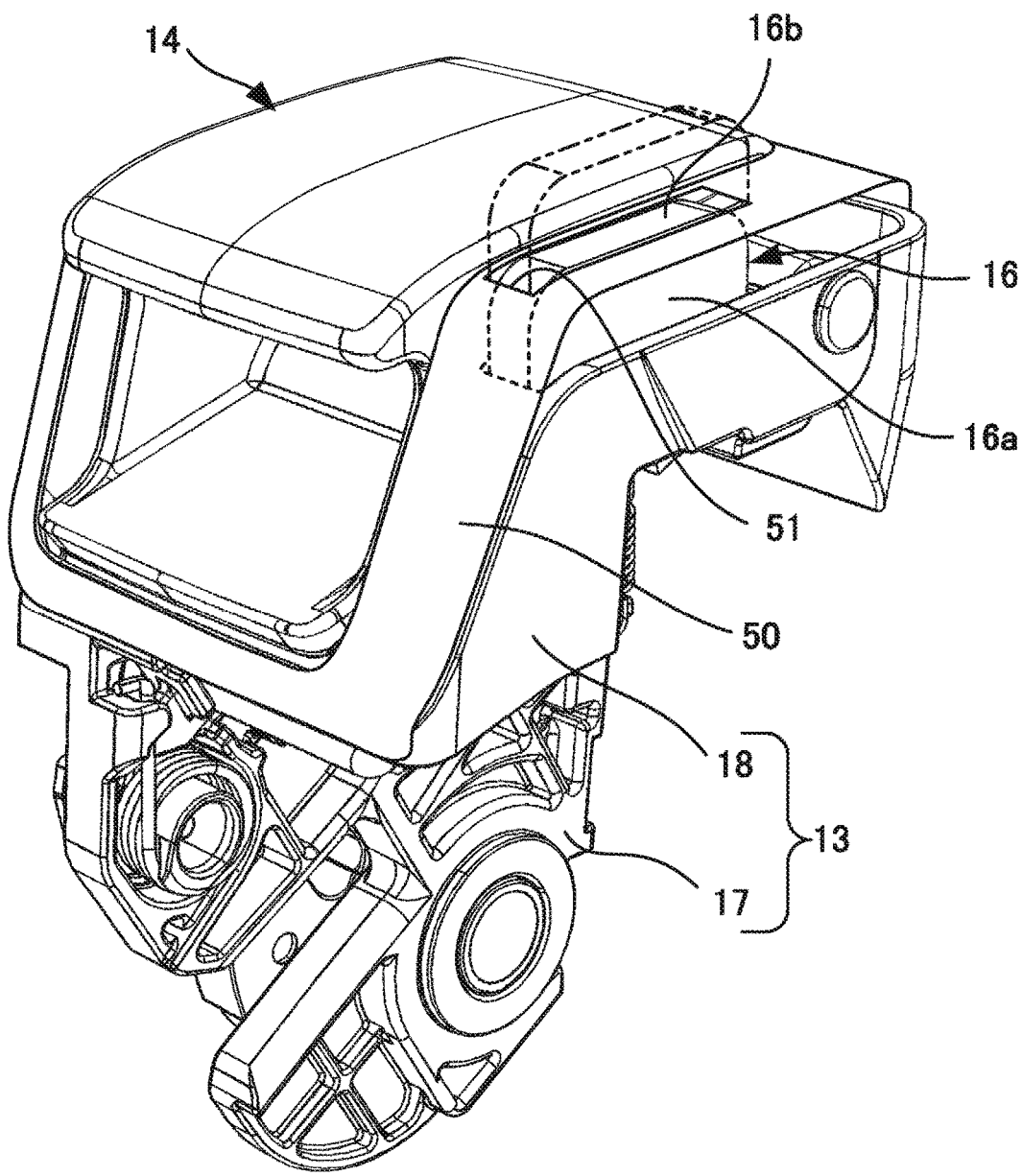

[FIG. 7]
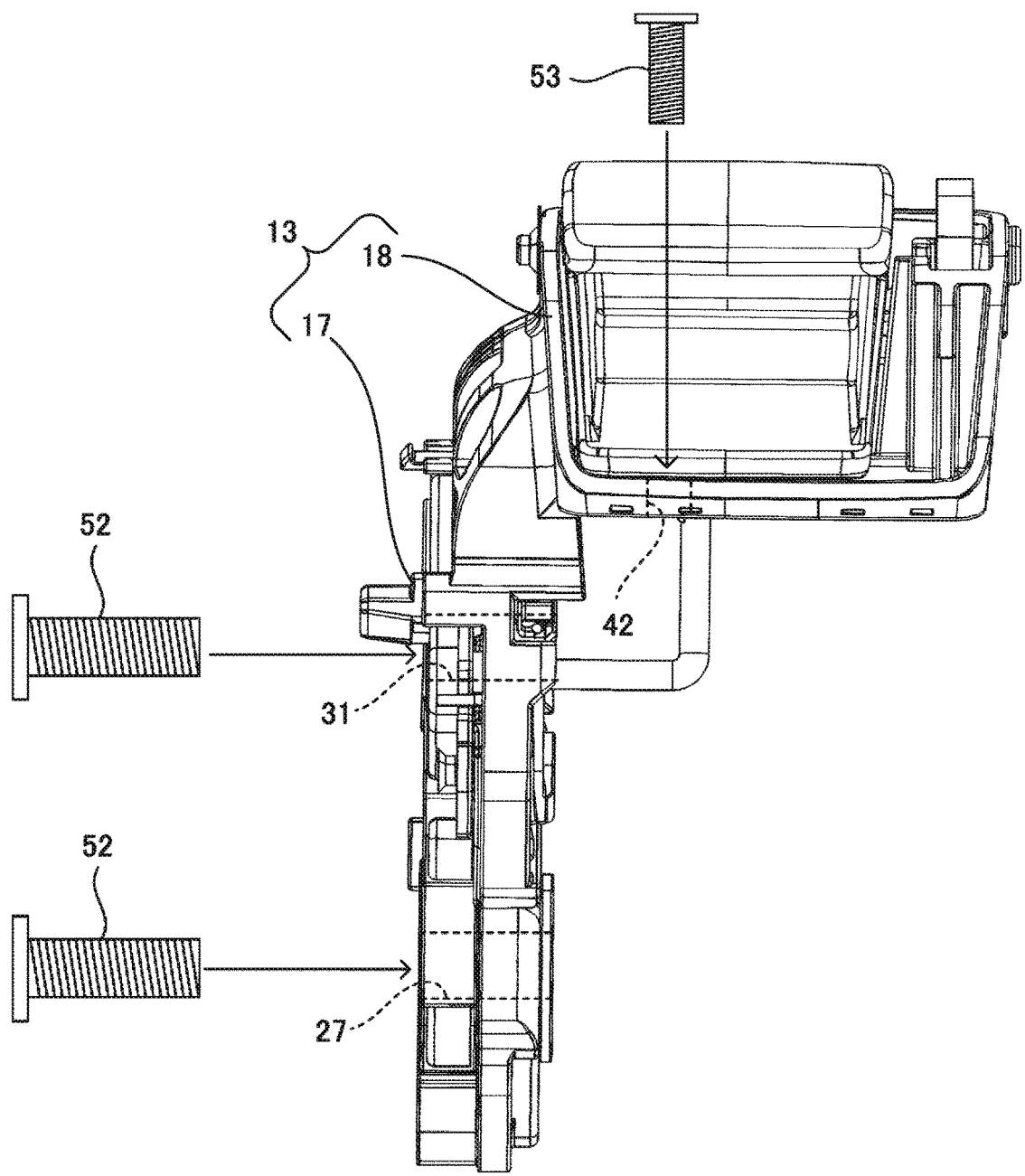

SEAT LOCK DEVICE

RELATED APPLICATIONS

The present application claims priority under 37 U.S.C. § 371 to International Patent Application No. PCT/JP2017/025578, filed Jul. 13, 2017. The content of this application is hereby incorporated by reference in its entirety.

TECHNICAL FIELD

The present invention relates to a seat lock device.

BACKGROUND ART

As a vehicle seat, there is known a seat which is provided with a seatback that can be folded and includes a seat lock device configured to prevent the seatback from falling flat by catching a striker set on a vehicle body.

A seat lock device described in PTL 1 includes a lock mechanism configured to catch a striker and an unlock knob mechanism coupled with the lock mechanism via a rod. With an operation knob of the unlock knob mechanism pulled to rise, the lock mechanism is put in an unlock state to release the catching of the striker, whereby the seatback is allowed to be folded down.

An indicator is provided on the unlock knob mechanism to indicate whether the lock mechanism is in a lock state or in the unlock state. The indicator is formed into a thin fan-shaped plate, and an arc surface and a front and rear surfaces of the indicator are painted red to configure warning surfaces. Then, the indicator is disposed in such a manner that the arc surface is directed to the front of the seatback and is supported rotatably at a central portion of the fan shape by a case that holds the unlock knob mechanism. In this configuration, when the operation knob is pulled to rise to put the lock mechanism in the unlock state, the indicator is rotated as the operation knob is so operated and projects from the case. With the indicator projecting from the case, the warning surfaces of the indicator become visible from the front of the seatback and sides of the seatback. Thus, whether the lock mechanism is in the lock state or in the unlock state can be confirmed from the front of the seatback and the sides of the seatback.

CITATION LIST

Patent Literature

PTL 1: Japanese Patent No. 5574219

SUMMARY OF INVENTION

Technical Problem

In the seat lock device described in PTL 1, the lock mechanism and the unlock knob mechanism are held in separate cases, and the case holding the lock mechanism is disposed on a side portion of the seatback, while the case holding the unlock knob mechanism is disposed on an upper end portion of the seatback, the cases being fixed to a seat frame separately. In this case, in an assembling process of assembling the cases to the seatback, the case for the lock mechanism, the case for the unlock knob mechanism, and further a rod that couples the lock mechanism with the unlock knob mechanism need to be assembled to the seatback, some difficulty is caused in the working efficiency.

Further, the relative positions of the lock mechanism and the unlock knob mechanism vary depending upon the accuracy of assembling positions where both the mechanisms are assembled to the seatback and the working accuracy of the seat frame. There are fears that a design to deal with the variation in the relative positions of both the mechanisms may call for enlargement in size of the lock mechanism and the unlock knob mechanism, and to deal with the variation in the relative positions, the assembling positions of both the mechanisms need to be adjusted in the assembling process of assembling the mechanisms to the seatback, causing fears that the adjustment of the assembling positions may call for a further deterioration in the working efficiency.

The present invention has been made in view of the situations described above, and an object thereof is to provide a seat lock device that has a superior working efficiency in being assembled to a seatback and that can be miniaturized in size.

Solution to Problem

According to one illustrative aspect of the present invention, a seat lock device provided on a seatback configured to be folded, the seat lock device may comprise: a lock unit configured to be shifted into a lock state where the lock unit catches a striker that is installed on a vehicle body, an unlock state where the lock unit is able to release the catching of the striker, and a free state where the lock unit releases the catching of the striker; an unlock unit disposed on the seatback at a location different from the lock unit, the unlock unit comprising a lever member and a coupling member configured to couple the lever member with the lock unit, the unlock unit being configured to shift the lock unit from the lock state to the unlock state in response to an operation on the lever member; and a case integrally molded, the case holding the lock unit and the unlock unit and being assembled to the seatback.

Advantageous Effects of Invention

According to the invention, the seat lock device that has the superior working efficiency in being assembled to the seatback and that can be miniaturized in size.

BRIEF DESCRIPTION OF DRAWINGS

FIG. 1 is a drawing of an example of a seat including a seat lock device, illustrating an embodiment of the invention.

FIG. 2 is an exploded perspective view of a lock unit of the seat lock device.

FIG. 3 is a front view of the seat lock device.

FIG. 4 is a perspective view of the seat lock device.

FIG. 6 is a perspective view showing an operation of an indicator member.

FIG. 7 is a schematic diagram showing an assembling method of assembling the seat lock device to a seatback.

DESCRIPTION OF EMBODIMENTS

Figure 5C:
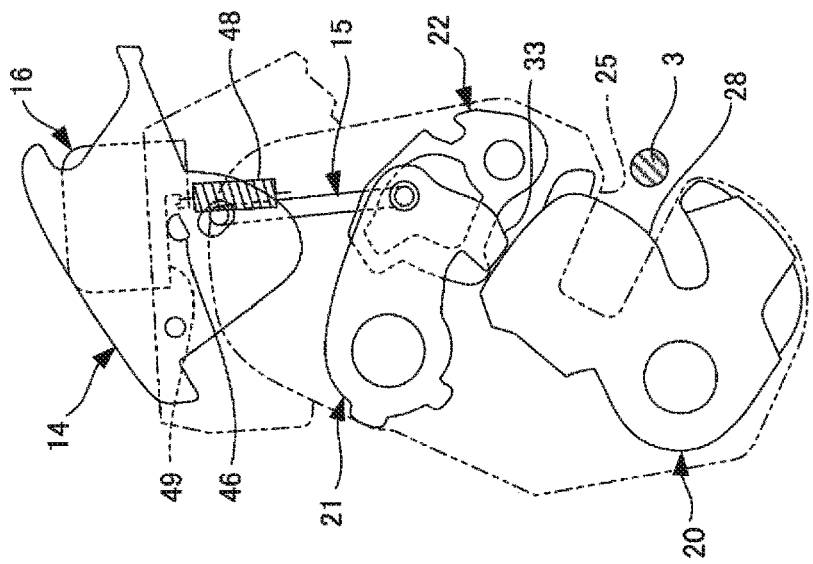
FIG. 5(C) is a schematic diagram of the seat lock device when the seat lock device is in a free state.

FIG. 1 shows an example of a seat that includes a seat lock device for illustrating an embodiment of the present invention.

A seat 1 is a seat to be set in a vehicle like a motor vehicle. The seat 1 includes a seatback 2 that can be tilted and folded towards a front of the seat 1, and a seat lock device 10 is provided on the seatback 2. Additionally, a striker 3 is provided on a vehicle body on which the seat 1 is set, and the striker 3 is disposed in a position where the striker 3 lies opposite to a side portion 2a of the seatback 2 that lies on one side of the seatback 2 in a width or transverse direction thereof with the seatback 2 raised. The seat lock device 10 prevents the seatback 2 from being folded by catching the striker 3 and holds the seatback 2 in the raised state.

FIGS. 2 to 4 show the seat lock device 10.

The seat lock device 10 includes a lock unit 11, an unlock unit 12, and a case 13.

The lock unit 11 is disposed at the side portion 2a of the seatback 2 (refer to FIG. 1). The lock unit 11 is configured to catch the striker 3. Then, the lock unit 11 can be shifted into a lock state where the lock unit 11 catches the striker 3, an unlock state where the lock unit 11 is able to release the catching of the striker 3, and a free state where the catching of the striker is released.

The unlock unit 12 is disposed at a different portion from the portion where the lock unit 11 is disposed on the seatback 2, and in this embodiment, the unlock unit 12 is disposed at an upper end portion 2b of the seatback 2 (refer to FIG. 1). The unlock unit 12 includes a lever member 14 and a rod 15 as a coupling member that couples the lever member 14 with the lock unit 11 and can shift the lock unit 11 from the lock state to the unlock state in accordance with an operation performed on the lever member 14. Further, in this embodiment, the unlock unit 12 includes an indicator member 16 configured to indicate the state (the lock state, the unlock state, and the free state) of the lock unit 11.

The case 13 includes a first hold unit 17 for holding the lock unit 11 and a second hold unit 18 for holding the unlock unit 12. The first hold unit 17 is disposed at the side portion 2a of the seatback 2 and is fixed to a side frame (not shown) that is provided along the side portion 2a in an interior of the seatback 2. The second hold unit 18 is disposed at the upper end portion 2b of the seatback 2 and is fixed to an upper frame (not shown) that is provided along the upper end portion 2b in the interior of the seatback 2.

The case 13 is an integral part formed from a synthetic resin, and the first hold unit 17 and the second hold unit 18 are integrated with each other. A constituent member of the lock unit 11 is held by the first hold unit 17, and a constituent member such as the lever member 14 or the like of the unlock unit 12 is held by the second holding member 18, and further, the case 13 is assembled to the frames (the side frame and the upper frame) of the seatback 2 with the lock unit 11 and the lever member 14 coupled together via the rod 15.

Hereinafter, the configurations of the lock unit 11 and the unlock unit 12 will be described in detail.

The lock unit 11 includes a latch 20, a pawl 21, a cam 22, and a cover plate 23. The latch 20, the pawl 21, and the cam 22 are assembled to the first hold unit 17 of the case 13, and the cover plate 23 is assembled to the first hold unit 17 while holding the latch 20, the pawl 21, and the cam 22 between the first hold unit 17 and itself.

A striker groove 25A is provided in the first hold unit 17, and a striker groove 25B is provided in the cover plate 23, too, in such a manner as to overlap the striker groove 25A in the first hold unit 17. The striker 3 enters the striker grooves 25A, 25B (hereinafter, referred altogether to as a striker groove 25) when the seatback 2 is raised, while the striker 3 escapes from the striker groove 25 when the seatback 2 is caused to be folded.

The latch 20 is disposed at one side, that is, either at a left side or at a right side, of the striker groove 25 and is supported rotatably by a latch shaft 26 that is held by the first hold unit 17 and the cover plate 23. A through hole 27A is provided in the latch shaft 26 in such a manner as to penetrate the latch shaft 26 in an axial direction thereof, and a through hole 27B is provided in the first hold unit 17 in such a manner as to communicate with the through hole 27A, and further, a through hole 27C is also provided in the cover plate 23 in such a manner as to communicate with the through hole 27A. The through holes 27A to 27C, which configure a continuous through hole, (hereinafter, referred altogether to as a fixing hole 27) extend in the transverse direction of the seatback 2, and a fixing device such as a bolt for fixing the first hold unit 17 to the side portion 2a of the seatback 2 is inserted through the fixing hole 27.

The latch 20 includes a lock groove 28 for catching the striker 3. The latch 20 can rotate between a latch position where an opening of the lock groove 28 is disposed to deviate from the striker groove 25 (refer to FIG. 5(A)) and an unlatch position where the opening of the lock groove 28 is disposed to overlap an opening of the striker groove 25 (refer to FIG. 5(C)).

Then, the latch 20 is biased from the latch position towards the unlatch position by a torsion spring 29.

The pawl 21 is disposed at an opposite side to the latch 20 with the striker groove 25 disposed therebetween and is supported rotatably by a pawl shaft 30 that is held by the first hold unit 17 and the cover plate 23. A through hole 31A is provided in the pawl shaft 30 in such a manner as to penetrate the pawl shaft 30 in an axial direction thereof. A through hole 31B is provided in the first hold unit 17 in such a manner as to communicate with the through hole 31A. A through hole 31C is provided in the cover plate 23, too, in such a manner as to communicate with the through hole 31A. The through holes 31A to 31C, which configure a continuous through hole, (hereinafter, referred altogether to as a fixing hole 31) extend in the transverse direction of the seatback 2, and a fixing device such as a bolt for fixing the first hold unit 17 to the side portion 2a of the seatback 2 is inserted through the fixing hole 31.

The pawl 21 includes an abutment portion 33 configured to be brought into abutment with an engagement portion 32 that is provided on an outer circumference of the latch 20. The pawl 21 can rotate between a pawl locking position (refer to FIG. 5(A)) where the abutment portion 33 is disposed on a track of the engagement portion 32 when the latch 20 rotates from the latch position towards the unlatch position so that the abutment portion 33 is brought into engagement with the engagement portion 32 and a pawl unlocking position (refer to FIG. 5(B)) where the abutment portion 33 is disposed to deviate from the track of the engagement portion 32.

Then, the pawl 21 is biased from the pawl unlocking position towards the pawl locking position by a torsion spring 34. Additionally, one end of the rod 15 of the unlock unit 12 is connected to the pawl 21 via a collar 35 in such a manner as to rotate relatively, whereby the pawl 21 is rotated to the pawl unlocking position in accordance with an operation of the lever member 14 of the unlock unit 12.

The cam 22 is disposed at an opposite side to the latch 20 with the striker groove 25 disposed therebetween and is supported rotatably by a cam shaft 36 that is held by the first hold unit 17 and the cover plate 23.

The cam 22 includes a cam surface 37 that is brought into sliding contact with the engagement portion 32 of the latch 20. The cam 22 can rotate between an engagement position (refer to FIG. 5(A)) where the cam surface 37 enters the track of the engagement portion 32 that results when the latch 20 rotates from the latch position towards the unlatch position so that the cam surface 37 comes into sliding contact with the engagement portion 32 and a non-engagement position (refer to FIG. 5(B)) where the cam surface 37 is disposed to deviate from the track of the engagement portion 32.

Then, the cam 22 is biased from the non-engagement position towards the engagement position by a torsion spring 38. An engagement hole 39 is provided in the cam 22, and the one end of the rod 15, which is connected to the pawl 21, is inserted through this engagement hole 39. The cam 22 is rotated to the non-engagement position in accordance with an operation of the lever member 14 of the unlock unit 12.

As described above, the unlock unit 12 includes the lever member 14, the rod 15, and the indicator member 16. A lever storage portion 40 for storing the lever member 14 and an indicator storage portion 41 for storing the indicator member 16 are provided in the second hold unit 18 of the case 13 for holding the unlock unit 12. A fixing hole 42 extending in an up-down direction of the seatback 2 is provided in the lever storage portion 40, and a fixing device such as a bolt or the like for fixing the second hold unit 18 to the upper end portion 2b of the seatback 2 is inserted through this fixing hole 42.

The lever storage portion 40 is opened upwards and rearwards of the seatback. A finger hook portion 44 is provided at an end portion of the lever member 14 that lies on a rear side of the seatback, and an end portion of the lever member 14 that lies on a front side of the seatback is supported rotatably on a lever shaft 43 that straddles a space defined between both side walls of the lever storage portion 40 that face each other in the transverse direction of the seatback.

Figure 5B:
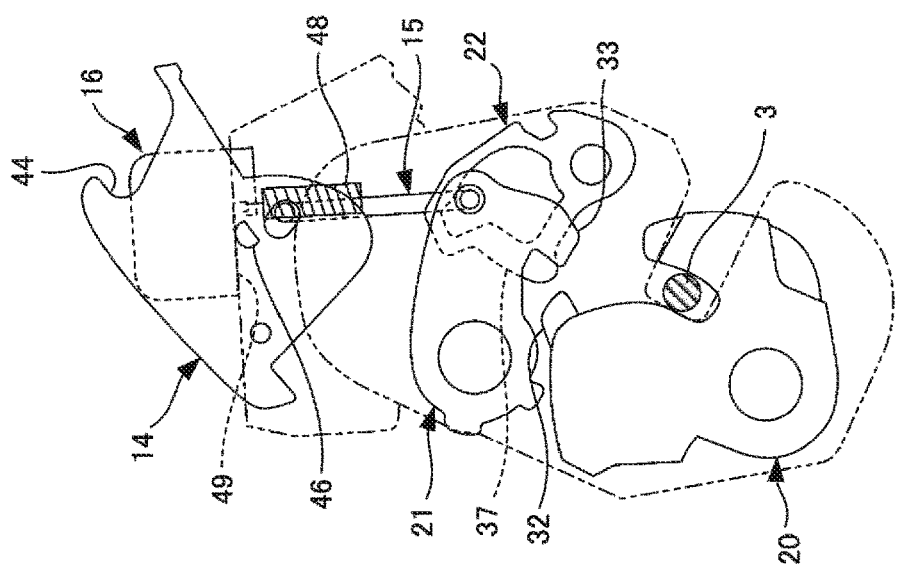
FIG. 5(B) is a schematic diagram of the seat lock device when the seat lock device is in an unlock state.
Figure 5A:
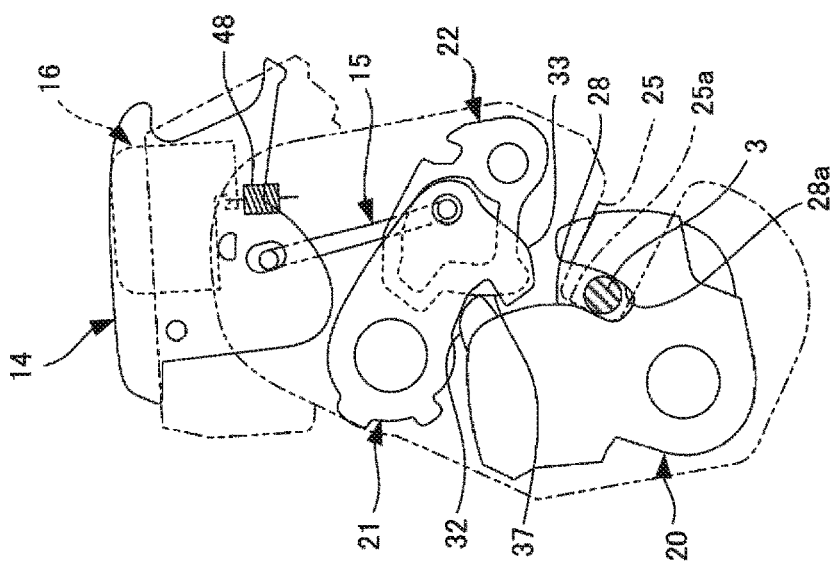
FIG. 5(A) is a schematic diagram of the seat lock device when the seat lock device is in a lock state.

The lever member 14 can rotate between a lever locking position (refer to FIG. 5(A)) where the lever member 14 is stored substantially wholly in the lever storage portion 40 and a lever unlocking position (refer to FIG. 5(B)) where a portion of the lever member 14 that lies on the rear side of the seatback is disposed to project upwards of the seatback from the lever storage portion 40 by the finger hook portion 44 being pulled upwards.

Then, the lever member 14 includes a rod connecting portion 45 to which the one end of the rod 15 is connected and a pressing projection 46 that is brought into engagement with the indicator member 16. The rod connecting portion 45 and the pressing projection 46 are exposed through a through hole formed in a bottom wall of the lever storage portion 40 that lies on a side facing a lower side of the seatback.

The one end of the rod 15 is held by a hook 47 and is connected to the rod connecting portion 45 of the lever member 14 via this hook 47 in such a manner as to rotate relative to the rod connecting portion 45. On the other hand, the other end of the rod 15 is coupled to the collar 35 and is connected to the pawl 21 of the lock unit 11 via this collar 35 in such a manner as to rotate relative to the pawl 21. The lever member 14 stored in the lever storage portion 40 is disposed to deviate in the transverse direction of the seatback with respect to the lock unit 11 so as not to be superposed on the lock unit in the up-down direction of the seatback. The rod 15 includes a first portion 15a that extends downwards of the seatback from the rod connecting portion 45, a second portion 15b that extends in the transverse direction of the seatback from the pawl 21, and a bent portion 15c that is bent substantially at 90 degrees so as to connect the first portion 15a with the second portion 15b and is formed substantially into an L-like shape as a whole.

The pawl 21 is biased from the pawl unlocking position towards the pawl locking position by the torsion spring 34, and the lever member 14 that is coupled with the pawl 21 by the rod 15 is pulled from the lever unlocking position towards the lever locking position.

The indicator storage portion 41 extends in the up-down direction of the seatback. The indicator member 16 is supported to be translational in the up-down direction of the seatback by the indicator storage portion 41. The indicator member 16 can be translated from a storage position (refer to FIG. 5(A)) where the indicator member 16 is stored in the lever storage portion 40 except for an end portion that lies to face an upper side of the seatback towards the upper side of the seatback.

Then, the indicator member 16 is biased downwards to a lower side of the seatback to be directed toward the storage position by a coil spring 48. A pressure receiving portion 49 that is brought into engagement with the pressing projection 46 of the lever member 14 is provided at an end portion of the indicator member 16 that lies to face a lower side of the seatback, and the indicator member 16 is pushed up from the storage position towards the upper side of the seatback in response to an operation of the lever member 14.

The indicator member 16 has a substantially rectangular plate-like shape, and an outer circumferential surface of the indicator member 16 that is substantially parallel to a translational direction of the indicator member 16 is, for example, painted a conspicuous color such as red to thereby configure a warning surface 16a along an entire circumference of the outer circumferential surface.

Next, referring to FIGS. 5(A) to (C) and 6, an operation of the seat lock device 10 will be described.

FIG. 5(A) shows the seat lock device 10 that stays in the lock state. The striker 3 enters the striker groove 25 and the lock groove 28. The latch 20 is disposed in the latch position, and the opening of the lock groove 28 is disposed to deviate from the striker groove 25. Then, the pawl 21 is disposed in the pawl locking position, and the abutment portion 33 is disposed on the track of the engagement portion 32 when the latch 20 rotates towards the unlatch position. The latch 20 is prevented from rotating to the unlatch position by an abutment of the engagement portion 32 with the abutment portion 33, the latch 20 catches the striker 3.

Further, the cam 22 is disposed in the engagement position, and the cam surface 37 enters the track of the engagement portion 32 that results when the latch 20 rotates towards the unlatch position, whereby the engagement portion and the cam surface 37 are in a sliding contact with each other. As a result of the engagement portion 32 being brought into sliding contact with the cam surface 37, the latch 20 is pushed in towards the latch position, whereby the striker 3 is held between a bottom surface 25a of the striker groove 25 and a side surface 28a of the lock groove 28 that is located opposite to the bottom surface 25a. As a result, the loosening of the striker 3 is suppressed, whereby the generation of abnormal noise attributed to the loosening of the striker 3 is suppressed.

The lever member 14 is pulled by the pawl 21 via the rod 15 and is disposed in the lever locking position. Then, the indicator member 16 is biased to be disposed in the storage position by the coil spring 48. As shown in FIG. 6, the second hold unit 18 of the case 13 is covered by a garnish 50 that configures a decorative member of the seat, and an opening or a window 51 is provided in the garnish 50 in such a manner that the indicator member 16 is exposed through the window 51. With the indicator member 16 kept disposed in the storage position, only an upper end surface 16*b* of the indicator member 16 is visible through the window 51, and the warning surface 16*a* of the indicator member 16 is covered to be hidden by the garnish 50.

FIG. 5(B) shows the seat lock device 10 that stays in the unlock state. The finger hook portion 44 of the lever member 14 is pulled up, whereby the lever member 14 is disposed in the lever unlocking position. The pawl 21 is pulled via the rod 15 by the lever member 14 to thereby be disposed in the pawl unlocking position, and the abutment portion 33 is disposed to deviate from the track of the engagement portion 32. The cam 22 is also pulled by the lever member 14 via the rod 15 and is disposed in the non-engagement position, and the cam surface 37 is disposed to deviate from the track of the engagement portion 32. As a result of the abutment of the abutment portion 33 with the engagement portion 32 being released, the latch 20 is permitted to rotate towards the unlatch position, whereby the catching of the striker 3 can be released.

The indicator member 16 is pushed up by the lever member 14 via the pressing projection 46 and the pressure receiving portion 49 and is translated from the storage position towards the upper side of the seatback. As shown in FIG. 6, the indicator member 16 is disposed to project from the window 51 of the garnish 50, and the warning surface 16*a* of the indicator member 16 is exposed through the window 51.

FIG. 5(C) shows the seat lock device 10 that stays in the free state. When the seatback 2 is caused to be folded towards the front of the seat in the unlock state shown in FIG. 5(B), the latch 20 is pressed by the striker 3 to be disposed in the unlatch position. As a result of the latch 20 being disposed in the unlatch position, the opening of the lock groove 28 is disposed to overlap the striker groove 25. When the seatback 2 is caused to be folded further towards the front of the seat, the striker 3 escapes from the striker groove 25 and the lock groove 28, whereby the catching of the striker 3 is released.

The lever member 14 is released, and the pawl 21 is rotated towards the pawl locking position by the torsion spring 34. However, the abutment portion 33 is brought into abutment with an outer circumferential surface of the latch 20, whereby the pawl 21 is forced to stop rotating in a position immediately before the pawl locking position. The lever member 14 is also stopped in a position immediately before the lever locking position, that is, in a position between the lever locking position and the lever unlocking position. As a result of the lever member 14 being stopped in the position immediately before the lever locking position, the indicator member 16 is also stopped in a position immediately before the storage position, and the indicator member 16 is disposed to project from the window 51 of the garnish 50, whereby the waning surface 16*a* is exposed through the window 51.

When the seat lock device 10 stays in the unlock state and the free state, the indicator member 16 is translated from the instating position towards the upper side of the seatback, and the warning surface 16*a* is exposed. Here, since the warning surface 16*a* is provided to extend over the entire circumference of the outer circumference surface that is substantially parallel to the translational direction of the indicator member 16, the waning surface 16*a* becomes visible not only from the front of the seatback and the side of the seatback but also from the rear of the seatback, whereby a superior visibility can be provided. As a result, a risk of the warning indication by the indicator member 16 failing to be recognized can be reduced as when the seatback 2 is raised from a luggage compartment side to the rear of the seatback.

In the seat lock device 10 configured as described above, the first hold unit 17 and the second hold unit 18 of the case 13 are integrated with each other, and the constituent members of the lock unit 11 such as the latch 20, the pawl 21 and the like are held in the first hold unit 17, while the constituent members of the unlock unit 12 such as the lever member 14 and the like are held in the second hold unit 18 of the case 13. Further, the case 13 is assembled to the frames (the side frame and the upper frame) of the seatback 2 with the pawl 21 and the lever member 14 coupled together via the rod 15. As a result, the process of assembling the seat lock device 10 to the seatback 2 can be simplified, thereby making it possible to enhance the working efficiency.

Then, the relative positions of the lock unit 11 and the unlock unit 12 are determined not by the working accuracy of the frames of the seatback 2 but by the molding accuracy of the case 13, and therefore, the variation in the relative positions of the lock unit 11 and the unlock unit 12 can be reduced. The lock unit 11 and the unlock unit 12, which are designed by taking the variation in the relative positions thereof into consideration, can be miniaturized in size.

The first hold unit 17 and the second hold unit 18 are integrated with each other, and therefore, fixing the first hold unit 17 to the seatback 2 and fixing the second hold unit 18 to the seatback 2 can complement each other, thereby making it possible to enhance the fixing strength of the case 13 to the seatback 2. In particular, as shown in FIG. 7, the first hold unit 17 is fixed to the side portion 2*a* of the seatback 2 with fixing devices 52 such as bolts that are inserted through the fixing holes 27, 31 that extend in the transverse direction of the seatback, and the second hold unit 18 is fixed to the upper end portion 2*b* of the seatback 2 with a fixing device 53 such as a bolt that is inserted through the fixing hole 42 that extends in the up-down direction of the seatback. In this way, the fixing direction of the first hold unit 17 intersects the fixing direction of the second hold unit 18, and therefore, thereby making it possible to enhance further the fixing strength of the case 13.

INDUSTRIAL APPLICABILITY

The present invention can be applied to a seat including a seatback that can be folded towards the front of the seat.

REFERENCE SIGNS LIST

1: Seat
2: Seatback
3: Striker
10: Seat lock device
11: Lock unit
12: Unlock unit
13: Case
14: Lever member
15: Rod (Coupling member)
16: Indicator member
17: First hold unit
18: Second hold unit
20: Latch
21: Pawl
22: Cam 23: Cover plate
25: Striker groove
26: Latch shaft
27: Fixing hole
28: Lock groove
30: Pawl shaft
31: Fixing hole
32: Engagement portion
33: Abutment portion
35: Collar
36: Cam shaft
37: Cam surface
39: Engagement hole
40: Lever storage portion
41: Indicator storage portion
42: Fixing hole
43: Lever shaft
44: Finger hook portion
45: Rod connecting portion
46: Pressing projection
47: Hook
48: Coil spring
49: Pressure receiving portion
50: Garnish
51: Window
52: Fixing device
53: Fixing device

The invention claimed is:

1. A seat lock device provided on a seatback configured to be folded, the seat lock device comprising:
   a lock device configured to be shifted into a lock state where the lock device catches a striker that is installed on a vehicle body, an unlock state where the lock device is able to release the catching of the striker, and a free state where the lock device releases the catching of the striker;
   an unlock device disposed on the seatback at a location different from the lock device, the unlock device comprising a lever member and a coupling member configured to couple the lever member with the lock device, the unlock device being configured to shift the lock device from the lock state to the unlock state in response to an operation on the lever member; and
   a case integrally molded and formed as a single piece, the case holding the lock device and the unlock device and being assembled to the seatback,
   wherein the lock device is disposed at a side portion of the seatback,
   wherein the unlock device is disposed at an upper end portion of the seatback,
   wherein the case comprises at least one first fixing portion configured to be fixed to the side portion of the seatback and at least one second fixing portion configured to be fixed to the upper end portion of the seatback, and
   wherein a fixing direction of the first fixing portion with respect to the seatback and a fixing direction of the second fixing portion with respect to the seatback intersect each other.

2. The seat lock device according to claim 1,
   wherein the lever member deviates in a width direction of the seatback with respect to the lock device such that the lever member is not superposed on the lock device in an up-down direction of the seatback.

3. The seat lock device according to claim 1,
   wherein the unlock device further comprises an indicator member supported on the case to be translational in the up-down direction of the seatback,
   wherein in a case when the lock device is in the lock state, the indicator member is disposed in a storage position where the indicator member is stored,
   wherein in a case the lock device is in the unlock state or the free state, the indicator member is disposed further upwards of the seatback than the storage position, and
   wherein an outer circumferential surface of the indicator member configures a warning indication surface, the warning indication surface extending over an entire circumference of the outer circumferential surface.

* * * * *